(12) United States Patent
Kepper (10) Patent No.: US 12,552,501 B2
(45) Date of Patent: Feb. 17, 2026

(54) MARINE LIGHTING ASSEMBLY (71) Applicant: A.D. KEPPER INVESTMENTS PTY LTD, Southbank (AU)

(72) Inventor: Daniel Alexander Kepper, Victoria (AU)

(73) Assignee: A.D. KEPPER INVESTMENTS PTY LTD, Southbank (AU)

( * ) Notice: Subject to any disclaimer, the term of this patent is extended or adjusted under 35 U.S.C. 154(b) by 0 days.

(21) Appl. No.: 18/851,441

(22) PCT Filed: Mar. 23, 2023

(86) PCT No.: PCT/AU2023/050211
§ 371 (c)(1),
(2) Date: Sep. 26, 2024

(87) PCT Pub. No.: WO2023/183964
PCT Pub. Date: Oct. 5, 2023

(65) Prior Publication Data
US 2025/0223016 A1    Jul. 10, 2025

(30) Foreign Application Priority Data
Mar. 29, 2022 (AU) ................................ 2022900792

(51) Int. Cl.
*B63B 45/00* (2006.01)
*B63B 45/04* (2006.01)
*F21V 31/00* (2006.01)

(52) U.S. Cl.
CPC ............ *B63B 45/04* (2013.01); *F21V 31/005* (2013.01)

(58) Field of Classification Search
CPC ........ F21V 31/005; B63B 45/06; B63B 45/04
See application file for complete search history.

(56) References Cited

U.S. PATENT DOCUMENTS 4,367,517 A * 1/1983 Balzer ................. E04F 11/1804
362/306
4,954,932 A    9/1990 Isenga
(Continued)

FOREIGN PATENT DOCUMENTS

CN    203904887 U    10/2014
CN    204141489 U    2/2015
(Continued)

OTHER PUBLICATIONS

PCT/AU2023/050211. International Search Report (May 18, 2023).
PCT/AU2023/050211. International Preliminary Report on Patentability (Nov. 30, 2023).

*Primary Examiner* — Gerald J Sufleta, II
(74) *Attorney, Agent, or Firm* — Tyler J. Barrett; LOZA & LOZA, LLP (57) ABSTRACT

The invention relates to a marine lighting assembly that is configured for installation with a marine handrail which includes an opening in an external surface of the handrail leading to a handrail interior. The lighting assembly includes a mounting configured for connection to the handrail external surface in a position overlying the handrail opening. The mounting includes an outer side configured to face outwardly from the handrail and an underside configured to face toward the handrail. The lighting assembly further includes at least one sealing member locatable between the mounting underside and the handrail external surface for resisting water ingress between the mounting and the handrail external surface. The lighting assembly further includes a lighting device connected with the mounting and insertable through the handrail opening, the lighting device configured for location within the handrail interior and to provide light through a lighting opening in the mounting outer side.

20 Claims, 5 Drawing Sheets

(56) References Cited

U.S. PATENT DOCUMENTS

| | | | | |
|---|---|---|---|---|
| 5,504,342 | A * | 4/1996 | Jaynes | B63B 45/02 |
| | | | | 43/17.5 |
| 6,415,732 | B1 * | 7/2002 | Delorenzo | B63B 45/04 |
| | | | | 362/477 |
| 7,044,450 | B2 * | 5/2006 | Striebel | E04F 11/1817 |
| | | | | 256/65.16 |
| 7,051,464 | B2 * | 5/2006 | Kwon | B63B 45/04 |
| | | | | 40/550 |
| 9,604,703 | B2 * | 3/2017 | Kardas | B63B 17/04 |
| 11,333,312 | B2 * | 5/2022 | Hellin Navarro | B60Q 1/2665 |
| 2008/0165547 | A1 | 7/2008 | Amor et al. | |
| 2010/0110681 | A1 * | 5/2010 | Wilcox | B63B 45/04 |
| | | | | 362/235 |
| 2016/0320015 | A1 * | 11/2016 | Poole | F21V 3/062 |
| 2019/0142986 | A1 | 5/2019 | Zhang et al. | |
| 2022/0161906 | A1 * | 5/2022 | Kjorlien | B63B 45/04 |

FOREIGN PATENT DOCUMENTS

| | | |
|---|---|---|
| CN | 212056961 U | 12/2020 |
| CN | 215929351 U | 3/2022 |
| KR | 20170002091 A | 1/2017 |

\* cited by examiner

MARINE LIGHTING ASSEMBLY

PRIORITY CROSS-REFERENCE

This application claims priority to Australian provisional patent application AU 2022900792 filed 29 Mar. 2022, the entire contents of which is hereby incorporated by reference.

TECHNICAL FIELD

The invention relates to a lighting assembly for improving illumination and/or aesthetics at a marine environment such as a watercraft, dock, pier, jetty or other water-side installation. It will be appreciated that the invention is also suitable for used in non-marine applications and for example, as an outdoor lighting assembly intended for exposure to rain, dust and dirt and the like.

BACKGROUND OF INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Marine lighting devices such as marine courtesy lights are used in various applications on watercraft to illuminate areas of a cabin, passageway or outer deck. Marine lighting devices may also be used in onshore applications such as lighting for a jetty, seawall, pier, dock, seaside esplanade or other seaside structure. As well as illuminating walkways for persons onboard a watercraft or persons walking alongside a body of water, marine courtesy lights may be used to visually signal the location of a watercraft or a dock to other watercraft in order to facilitate docking or to avoid collisions.

In the watercraft application, marine courtesy lights are typically configured for surface-mounting low along the side of a cabin or deck. Similarly, in the onshore application marine lights are often surface mounted low on a seawall or on the ground surface of a jerry or pier.

In either instance, the relatively low positioning of the lighting reduces its effectiveness due to the reduction in lighting angle spread. This increases the probability of damage from impact by another watercraft and/or reduces illumination for persons walking near the lighting and/or may reduce the aesthetic effect provided.

SUMMARY OF INVENTION

In view of the above noted drawbacks with existing marine lighting, it is desirable to provide a marine lighting assembly which improves on existing systems or which provides an alternative choice for consumers.

According to an aspect of the invention, there is provided a marine lighting assembly configured for installation with a marine handrail which includes an opening in an external surface of the handrail leading to a handrail interior, the lighting assembly including: a mounting configured for connection to the handrail external surface in a position overlying the handrail opening, the mounting including an outer side configured to face outwardly from the handrail and an underside configured to face toward the handrail; at least one sealing member locatable between the mounting underside and the handrail external surface for resisting water ingress between the mounting and the handrail external surface; and a lighting device connected with the mounting and insertable through the handrail opening, the lighting device configured for location within the handrail interior and to provide light through a lighting opening in the mounting outer side.

The present invention advantageously provides a marine lighting assembly which is installable with a marine handrail or similar tubular structure in a marine environment. The invention thereby allows for lighting installation at an elevated position as compared to existing systems configured for low-level installation on a deck or cabin side. Marine handrails such as those found around the deck of a watercraft or alongside a seawall are at an elevated position which increases illumination for those walking near to the handrail as well as improving distant visibility so as to decrease the possibility of watercraft collision. Furthermore, the use of a marine handrail as a lighting location may allow for an aesthetic improvement to watercraft or land structures such as piers, seawalls and the like.

The assembly of the invention is configured to provide a robust seal against water and salt ingress. In particular, the assembly is configured to resist water and salt ingress into the handrail opening into which the lighting device is inserted. The mounting is configured to overlie the handrail opening and with the sealing member positioned to seal again water and salt ingress between the mounting and the handrail.

The mounting may have a relatively flat or plate-like configuration so as to provide a non-obtrusive installation into the handrail. The mounting may be configured to protrude only slightly from the handrail exterior surface. For example, in an embodiment of the invention the outer side of the mounting may be raised from the handrail exterior surface by approximately 2-4 mm. In a particular embodiment, the outer side of the mounting may be raised from the handrail exterior surface by approximately 3.2 mm.

The lighting assembly may be configured for use with handrails of various size or diameter. In a particular embodiment, the lighting assembly is configured for use with marine handrails or tubes ranging from approximately 19 mm to 32 mm diameter. In a particular embodiment, the lighting assembly is configured for use with a circular opening in the handrail or tube which is approximately 15 mm diameter or less. In a particular embodiment, the lighting assembly is configured for use with a circular opening in the handrail or tube which is approximately 14.4 mm diameter.

Whilst being suitable for installation with a marine handrail, the lighting assembly of the present invention may also be installed with other structures such as a bimini frame of a boat. The marine lighting assembly of the present invention may therefore also be configured for installation with an opening in a bimini frame or a hollow barrier or balustrade. The assembly may be configured for installation with a tubular structure such as a tubular handrail or bimini frame but could also be configured for installation with a non-tubular structure such as a square-sectioned handrail or barrier.

In an embodiment of the invention, the mounting includes a protrusion extending from the underside and insertable into the handrail opening. According to this embodiment, the mounting may include a portion which overlies the handrail exterior and a portion (the protrusion) inserted into the handrail opening. The protrusion may have a shape and/or size corresponding to the handrail opening. For example, the handrail opening and the protrusion may be circular. The protrusion may be a boss. The protrusion may have a diameter slightly less than a diameter of the handrail opening so as to facilitate insertion of the protrusion into the opening.

In a form of the invention, the protrusion extends only partly through the opening such that a distal end of the protrusion does not extend into the handrail interior. In an alternative form of the invention, the protrusion is sufficiently long so as to extend through the handrail opening and into the handrail interior.

In a form of the invention, the lighting opening extends from the mounting outer side and through the centrally through the protrusion. The protrusion may therefore have a hollow configuration and whereby the hollow centre of the protrusion forms part of the lighting opening.

The lighting opening may include an outside end at the outer side of the mounting and an inside end locatable within the handrail interior. In a form of the invention, the lighting device is connected to the protrusion at an inside end of the lighting opening. The inside end of the lighting opening may be adjacent or co-located with the distal end of the protrusion.

The protrusion and the lighting device may be connected at a location within the mounting interior. The connection between the lighting device and the protrusion may be a non-removable or permanent connection such as via an adhesive or welding or the lighting device and mounting being integrally formed.

Alternatively, the lighting device may be removably connected to the protrusion. This may advantageously facilitate servicing or repair or replacement of the lighting device or the mounting without affecting the other of the lighting device or the mounting. This may also allow for the lighting device to be conveniently adapted or replaced so as to emit a different coloured light. For example, the lighting device might be replaced with a lighting device configured to emit a different coloured light or may be modified with a coloured lens to change the colour of light emitted. Similarly, a removable connection between the lighting device and the protrusion may allow for the lighting to be replaced with a lighting device of differing brightness, if desired.

The removable connection between the protrusion and lighting device may be provided with a variety of configurations such as a threaded connection, bayonet connection, snap-fit connection, latch connection, clamp connection or interference connection. In a particular form of the invention the lighting device is connected to the protrusion via a threaded engagement. More particularly, the protrusion may include an internal thread engaged with an external thread at an end of the lighting device. The external thread may be provided on a boss portion of the lighting device.

As noted, the protrusion may comprise various shapes or configurations and which may be configured to correspond with the shape of the handrail opening. In a form of the invention the protrusion has a circular configuration and comprises a central boss extending from the mounting underside.

The mounting may be configured for connecting with handrails of various shapes or sizes. Alternatively, the mounting may be configured for connecting with a handrail of particular shape or size. For example, the mounting may be configured to fit with a tubular handrail of a particular diameter. The mounting underside may be shaped to correspond with a shape of the handrail external surface. For example, the assembly may be configured for use with a tubular or curved handrail external surface and in which case the mounting underside may be provided with a corresponding curvature. This configuration may advantageously allow the mounting to partially 'wrap' circumferentially around the mounting exterior and so as to maintain an interface between the mounting and the handrail and facilitate sealing between the handrail and the mounting underside.

In a form of the invention, the mounting has an elongate profile having a length direction and a width direction and whereby the mounting is configured for installation with a tubular handrail such that the length direction is parallel with an longitudinal axis of the handrail. In this configuration, the mounting underside may be curved along its width direction so as to correspond with the curvature of the handrail outer surface.

The mounting may comprise any suitable configuration or shape suitable to allow connection (i.e. mounting) to a handrail or elongate structure. In a form of the invention, part of the lighting device might be received within part of the mounting such that the mounting operates as a housing as well as facilitating mounting or connection to the handrail exterior surface. For example, part of the assembly may be located within or 'housed' inside part of the mounting. In a form of the invention the lighting assembly includes a lens housed within the mounting and, in particular, in the lighting opening which extends through the mounting.

It will be appreciated that whilst the mounting is suitable for installation with a marine handrail it may be used in non-marine applications and installed with structures other than handrails. For example, the assembly might be installed within other hollow structures such as a road-side barrier or a fence rail or as part of a wall structure.

In an embodiment of the invention, the sealing member is located in one of more recess provided in the mounting underside. The sealing member may seat within the recess so as to properly locate the sealing member in the desired position and to facilitate its sealing operation. The sealing member may comprise a gasket or o-ring. The sealing member may be formed of a resiliently deformable material such as rubber.

In a particular form of the invention, the sealing member comprises a rubber gasket which includes an outer loop portion and an inner loop portion, the outer loop portion locatable adjacent a periphery of the mounting and the inner loop portion locatable adjacent a periphery of the handrail opening. The inner loop portion may be configured for location in a recess surrounding a root (i.e. a proximal end) of the protrusion. The inner loop portion may be configured to surround an edge of the handrail opening.

The inner and outer loop portions of the sealing member may advantageously provide a two-stage resistance against water ingress into the handrail opening. In particular, the outer loop portion may be configured to provide a first stage of water ingress resistance and the inner loop portion configured to provide a second stage of water ingress resistance. The outer loop portion may be located adjacent a peripheral edge of the mounting and thereby resist water ingress between the peripheral edge of the mounting and the handrail. In the event of water ingress beyond the outer loop portion, the inner loop portion may operate as a second line of resistance against water ingress into the handrail opening. This configuration advantageously provides a high level of water and salt resistance not found (nor necessary) in interior lighting fittings.

In a form of the invention, both the mounting and the outer loop portion of the gasket have an obround profile (also known as a stadium profile).

In a form of the invention, the mounting is removably connected to the handrail exterior surface to facilitate servicing and/or lighting device colour change. In a form of the invention, the mounting includes two or more fastener openings extending between the mounting outer side and mounting underside, the fastener openings configured to receive fasteners for connecting the mounting to the handrail external surface. The fastener openings may include countersunk bolt openings and the assembly further including two or more bolts configured to be countersunk within the outer side of the mounting. This configuration may provide a desirable 'flush' finish whereby the outer side of the mounting is free from protrusions which could create snag points if the handrail is used to tie-off marine ropes and the like.

In another form of the invention, the mounting may be connected to the handrail via rivets or adhesive or via other non-removable attachment methods.

In a form of the invention, the assembly has at least one line of symmetry. The lighting opening may be located approximately centrally in the mounting. For example, the mounting may have a symmetrical configuration with a line of symmetry extending through the centre of the lighting opening. The lighting opening may include a conical portion which narrows from the mounting outer side towards the mounting underside. In a particular form of the invention, the conical portion has a 50° cone angle which corresponds to a 50° beam angle.

In a particular form of the invention, the lighting assembly includes a lens positioned at a light-emitting end of the lighting device. The lens may be configured to diffuse light as well as prevent water ingress into the lighting assembly. The assembly may include a sealing member located between the lens and an abutment portion of the mounting. The sealing member may comprise an O-ring positioned between the lens and the abutment portion. The abutment portion may comprise an circular shoulder located at the lighting opening and in an interior of the protrusion.

The lighting device may have various configurations which may depend upon the intended use for the lighting assembly. For example, a particular lighting device may be selected for an application requiring a certain colour or lighting intensity. In a form of the invention, the lighting device includes a body having a light-emitting element. The light-emitting element may comprise a light emitting diode (LED). The body may include heat-dissipation fins which are located, in use, within the handrail interior. The body may have a generally cylindrical profile. The body may have a cylindrical profile with a diameter similar or slightly less than that of the protrusion so as to enable insertion of the body through the handrail opening and into the handrail interior.

The lighting device may be configured to allow consumer-selected colour change. For example, the lighting device could include an adjustment LED device which permits different coloured light to be emitted from the same device. Alternatively, the assembly may be configured to allow a user to disconnected and replace a mono-colour lighting device with a mono-coloured lighting device of different colour.

In a form of the invention, the lighting device is battery powered and includes an internal battery for supplying power to the light-emitting element. In an alternative form of the invention, the lighting device includes a power supply cable configured to be fed through the handrail interior to a power source and/or to one or more light devices of other lighting assemblies installed in series along the handrail.

The power source could comprise a mains power source. For example, each lighting assembly in the handrail may be hard wired to a mains power source via a power cable fed internally along the handrail. The power cable may be cutt and re-joined at each lighting assembly. In an alternative embodiment, each lighting assembly could be connected to one or more other lighting assemblies in the handrail via a detachable waterproof plug.

The power supply cable may be configured to allow feeding through the handrail using a magnetic arrangement. For example, a leading side of a power supply cable could be fitted with a magnet and introduced to the handrail interior through an opening in the handrail. Another magnet may be located outside of the handrail and dragged along the handrail exterior whilst magnetically engaged with the interior magnet so as to pull the power cable in a desired path through the handrail. Installing a power cable via magnetic tracing may be particularly beneficial where the power cable is required to pass through intersections of handrails and whereby the use of flexible cable feeding members such as 'yellow tongue' may be unsuited for this purpose.

In a form of the invention, the mounting is formed of a stainless steel material which includes molybdenum. For example, the mounting may be formed of SAE 316 marine grade stainless steel. The use of marine grade stainless steel may be desirable in order to match existing marine handrail materials and for it's relative high strength. However, it will be appreciated that a variety of alternative materials could be used. In a form of the invention, the mounting is formed of another corrosion resistant metallic material such as aluminium, bronze, brass, copper or a combination thereof or an alloy of one or more thereof. In an alternative form of the invention, the mounting may be formed from of non-metallic corrosion-resistant materials such as polymer materials.

Another aspect of the invention may relate to a method for installing a the above-discussed marine lighting assembly. For example, a method of installing a marine lighting assembly according to any one of the preceding claims in a marine handrail, including the steps of; forming a circular opening in the marine handrail; forming a pair of fastener holes on opposite sides of the circular opening; positioning the mounting of the marine lighting assembly so as to overlie the handrail opening and whereby the lighting device is inserted into an interior of the handrail and the sealing member of the lighting assembly is located between the handrail and an underside of the mounting; and connecting the mounting to the handrail via fasteners engaged with the fastener holes.

In a particular embodiment of this method, the step of forming a circular opening in the marine handrail includes the steps of attaching a jig to the handrail, the jig configured for guiding a rotary cutting or drilling tool; and forming the circular opening in the handrail using the rotary cutting or drilling tool guided by the jig.

According to another aspect of the present invention there is provided a lighting arrangement including two or more of the above-discussed lighting assemblies which are installed in a marine handrail and connected via a power cable extending through an interior of the handrail, the power cable also extending through the interior to a power source for providing electrical power to the lighting devices of the two or more lighting assemblies.

BRIEF DESCRIPTION OF DRAWINGS

In order that the invention may be more fully understood, an embodiment of the present invention will now be described with reference to the figures in which.

DETAILED DESCRIPTION

Figure 1:
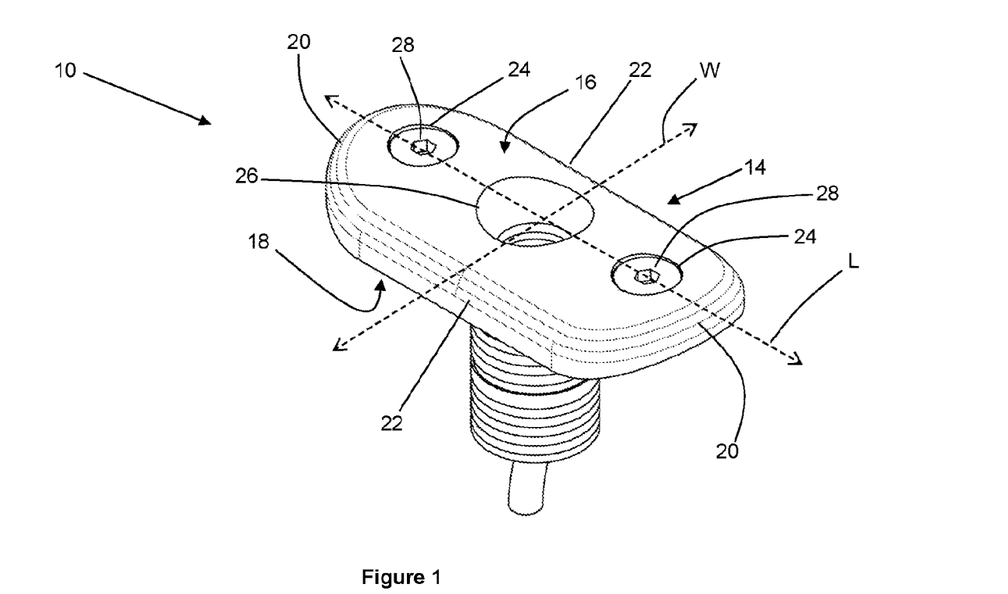
FIG. 1 is a perspective view of a lighting assembly according to an embodiment of the present invention.
Figure 2:
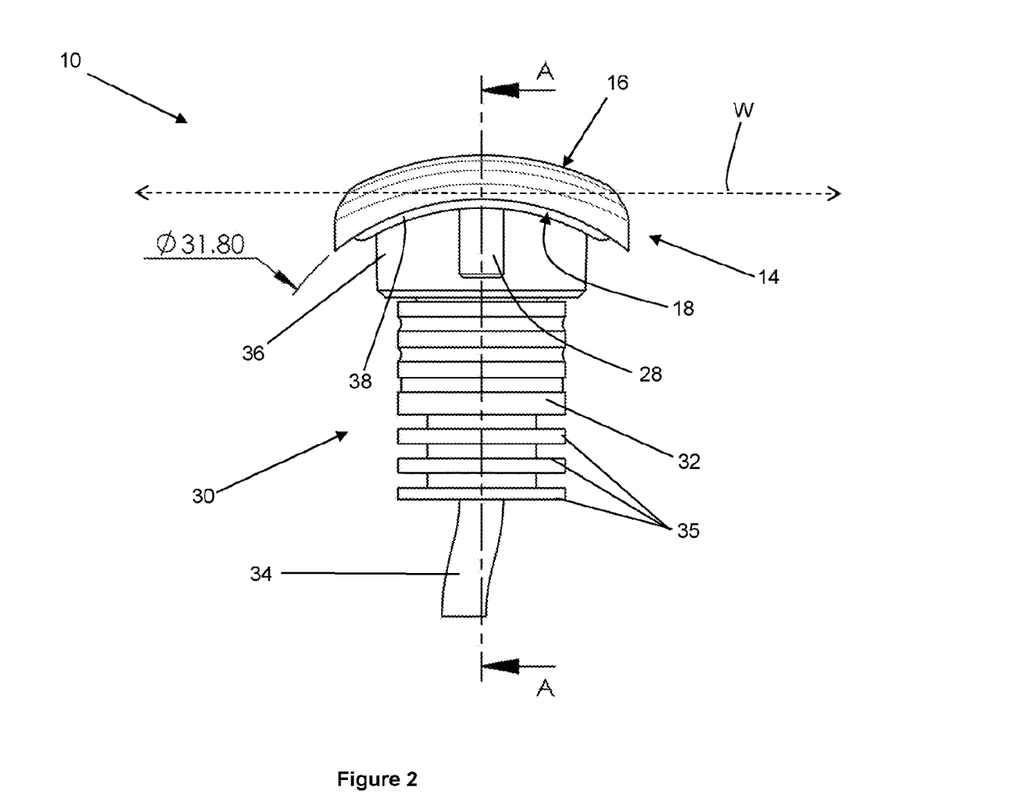
FIG. 2 is a side view of the lighting assembly of FIG. 1.

FIGS. 1 and 2 provide a perspective and side view respectively of a marine lighting assembly 10 according to an embodiment of the present invention. The assembly 10 is configured for installation with a marine handrail 12 as is exemplified in FIGS. 6-9.

The assembly 10 includes a mounting 14 including an outer side 16 and an underside 18. The mounting has a generally obround profile comprising a pair of opposite curved ends 20 and a pair of straight sides 22 extending between the pair of curved ends 20. The mounting 14 is elongate having a length direction L and a width direction W. The Mounting 14 includes a pair of bolt openings 24 spaced along the length direction L and on opposite sides of a central lighting opening 26. A pair of countersunk bolts 28 are received within bolt openings 24 and are used to connect the mounting to the handrail 12, as will be discussed subsequently in further detail.

The mounting 14 in the illustrated embodiment is configured for use with a tubular handrail. As seen in FIG. 2, the mounting 14 is curved along the width direction W so as to correspond and conform with curvature of the tubular handrail. It will be appreciated that the mounting 14 may have other configurations including non-curved configurations if intended for use with a different handrail such as a non-tubular handrail. As seen in FIG. 2 (also FIG. 9), both the outer side 16 and the under side 18 are curved in the width direction W. In the embodiment illustrated in FIG. 2, the underside 18 is shown provided with a curvature of diameter 31.8 mm and is therefore configured for fitting to a handrail having a 31.8 mm diameter (1¼ inch). The mounting 14 may be configured for use with popular or standard sizes of handrails such as ¾ inch, 1 inch and 1¼ inch diameter handrails. However, it will be appreciated that the invention may be used with various other handrail diameters or configurations and in this case the curvature of the mounting 12 can be configured as required.

The mounting 14 may be provided with a degree of curvature that is equivalent to that of the handrail for which it is intended. For example, the assembly 10 may be marketed for use with a tubular handrail of particular diameter and the assembly 10 provided with a mounting 14 having a curvature which corresponds with the particular handrail diameter. For example, briefly referring to FIG. 9, the underside 18 of the mounting 14 has a curvature which approximately corresponds with the curvature of handrail 12.

Returning to FIG. 2, the assembly 10 further includes a lighting device which comprises a LED device 30 having a cylindrical body 32 which includes heat dissipation fins 35 and a power supply cable 34 extending from a lower end of the body 32. The LED device 30 is connected with the mounting 14 and in particular is removably connected with a circular protrusion 36 (i.e. a boss) which forms part of the mounting 14 and which is located centrally at the mounting underside 18.

Figure 3:
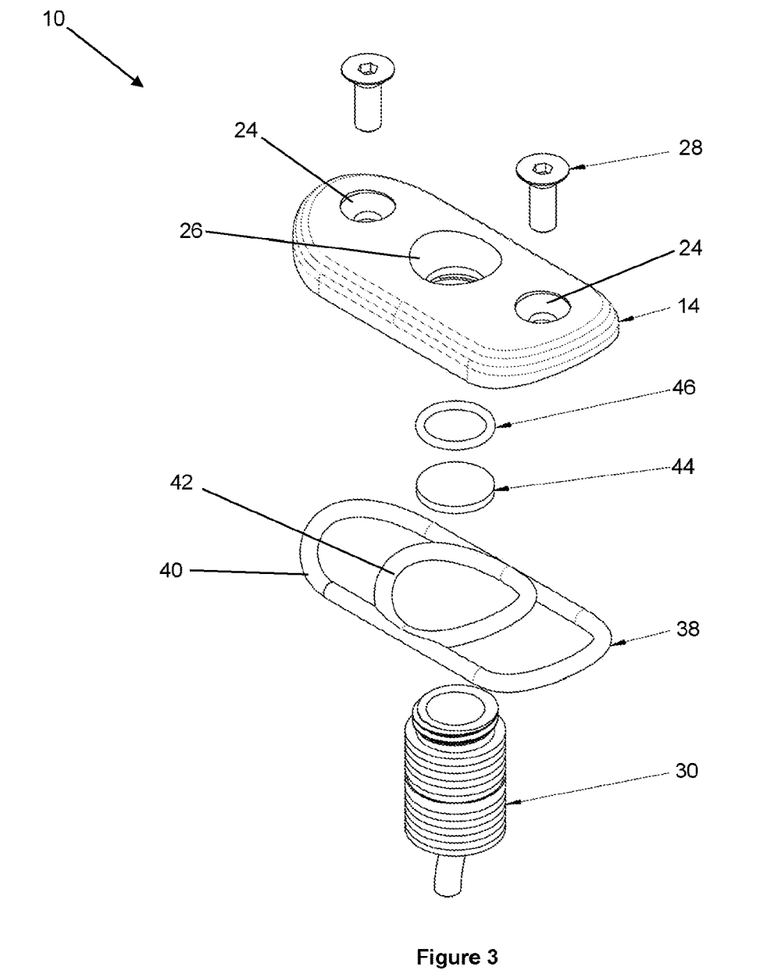
FIG. 3 is an exploded view of the lighting assembly in FIG. 1.

The assembly 10 further includes a sealing member which is partially shown in FIG. 2 but best illustrated in FIG. 3. Turning to FIG. 3, there is provided an exploded view of the assembly 10. The sealing member comprises a rubber gasket 38 having an obround outer loop portion 40 and a circular inner loop portion 42.

Figure 4:
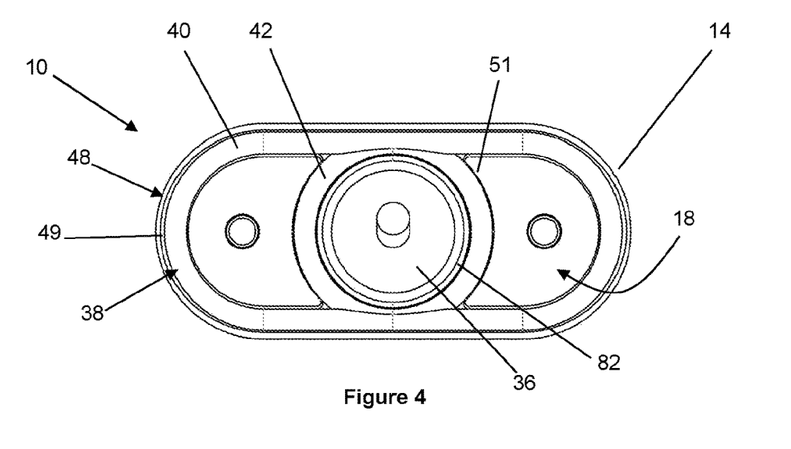
FIG. 4 is an underside view of the lighting assembly in FIG. 1.

As shown in FIG. 4 which provides an underside view of the assembly 10, the gasket 38 is received within a corresponding gasket recess 48 provided in the mounting underside 18. The gasket outer loop portion 40 extends adjacent a peripheral edge of the mounting 14 and the inner loop portion 40 extends around the circular protrusion 36.

The exploded view in FIG. 3 also shows a lens 44 and an o-ring 46 which are each positioned between the LED device 30 and the mounting 14 and which will be discussed in further detail with reference to FIG. 5.

Figure 5:
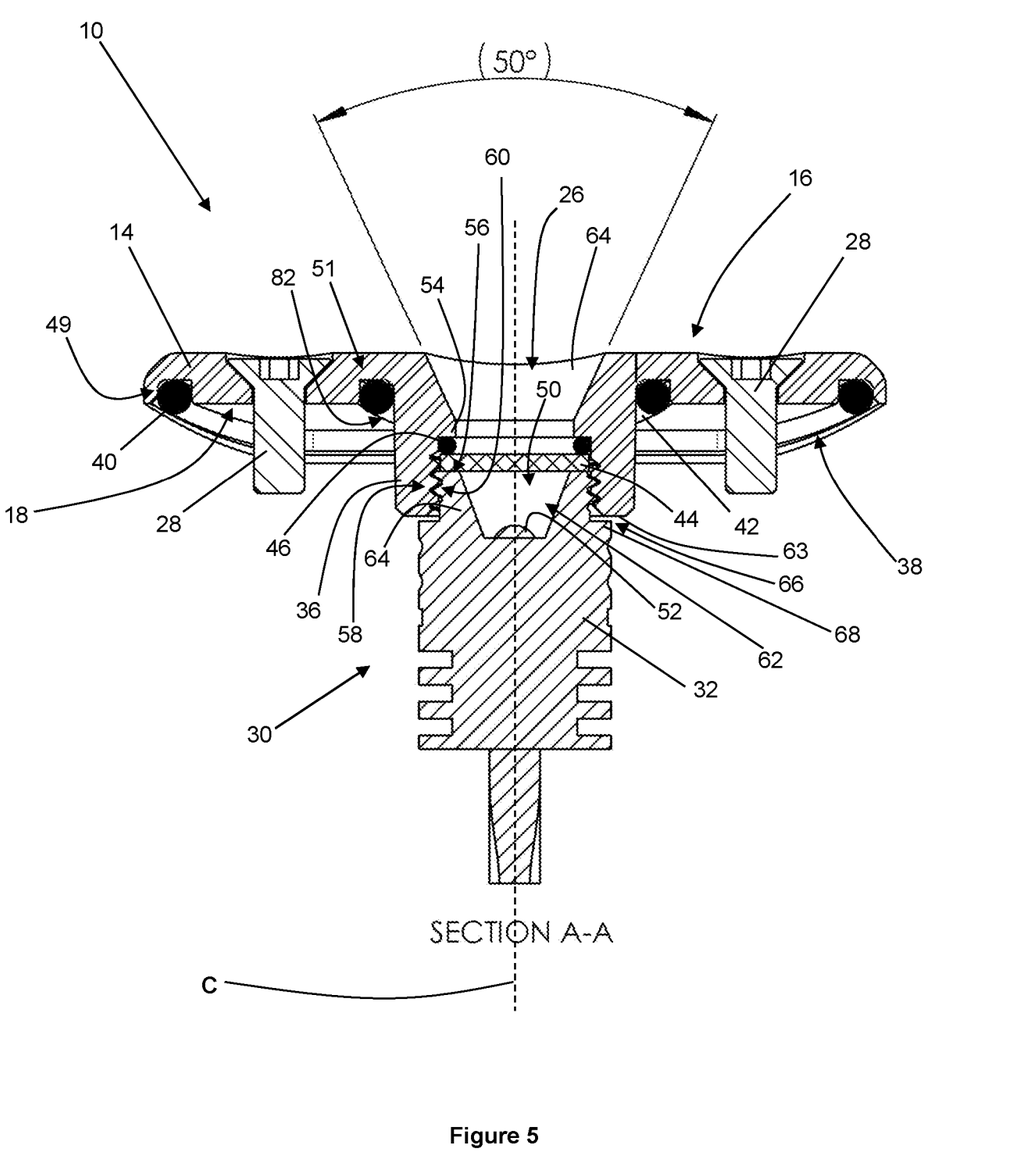
FIG. 5 is a cross-sectional view of the lighting assembly of FIG. 2 taken along the section labelled A-A.

Turning to FIG. 5 there is provided a side sectional view of the assembly 10 taken along the section A-A shown in FIG. 2. This view illustrates the gasket 38 received within the gasket recess which includes an outer loop recess 49 receiving the gasket outer loop portion 40 and an inner loop recess 51 receiving the gasket inner loop portion 42.

From FIG. 5 it will also be appreciated that the countersunk configuration of bolts 28 provide the mounting outer side 16 with a relatively smooth or 'flush' surface which advantageously reduces the possibility of marine ropes or ties becoming undesirable snagged or damaged. In some applications, the mounting which is raised above the exterior surface of the handrail may provide a hitching point which prevents ropes tied to the handrail from undesirably sliding along the handrail.

A central axis C is labelled in FIG. 5 which extends centrally through the lighting opening 26 and centrally through the circular protrusion 36 and centrally through the LED device 30. The central axis C also extends centrally through the o-ring 46 and the lens 44 whose positions within the assembly 10 are shown in FIG. 5. In particular, it can be seen that protrusion 36 has a hollow configuration such that the central light opening 26 extends through the protrusion 36 to a light-emitting end 50 of the LED device 30. The LED device 30 includes a light-emitting element comprising LED 52 at the light-emitting end 50 and which is also located on the central axis C.

The lens 44 and O-ring 46 are located within the central hollow of protrusion 36. More particularly, the O-ring 46 is positioned against an abutment portion which comprises a shoulder 54 on an interior of the protrusion 36. The lens 44 is positioned between the O-ring 46 and an end surface 56 of the LED device 30. The O-ring 46 is positioned between the shoulder 54 and the lens 44.

Both the lens 44 and O-ring 46 are compressed toward the shoulder 54 by the end surface 56 of the LED device 30 when the LED device 30 is threaded into the protrusion 36 so as to removably connect the LED device 30 with the mounting 12. As shown, the LED device 30 includes a boss portion 64 at its light-emitting end 50. The boss portion 64 provides an external thread 58 which is engaged with an internal thread 60 of the protrusion 36. The LED device 30 is thereby removably connected to the protrusion 36 at an inside end 62 of the lighting opening 26.

In FIG. 5, the LED device 30 is shown in a tightened position and in which the LED device 30 has been screwed into the protrusion 36 (driving lens 44 toward O-ring 46) until the O-ring 46 is compressed against the shoulder 54 and further screwing of the LED device 30 is resisted by the resilience of the O-ring 46. The compression (and some resilient deformation) of the O-ring 46 provides a seal against water ingress through the lighting opening 26 from the outer side 16 of the mounting 14. This seal resists water ingress around the outer edges of the lens 44 and prevents or resists water from contacting the LED 52.

With the LED device 30 in the tightened position shown in FIG. 5, a small gap 66 remains between a distal end 63 of the protrusion and a shoulder 68 on the LED device body 32. In certain applications, sealant may be applied to gap 66 in order to provide even higher resistance to water or salt ingress.

The lighting opening 26 includes a conical portion 64 which narrows from the mounting outer side 16 towards the mounting underside 18. As shown in FIG. 5, the conical portion 64 has a 50° cone angle which corresponds to a 50° beam angle. It will be appreciated that conical portion 64 could be provided with a different cone angle in order to provide a different beam angle and that beam angle might be selected according to the particular application required of the lighting assembly 10.

Still referring to FIG. 5, the gasket outer loop portion 40 is shown extending around the periphery of the mounting 14. The outer loop portion 40 circumscribes the bolts 28 and the inner loop portion 42 and the protrusion 36. The inner loop portion 42 circumscribes the protrusion 36. In particular, the inner loop portion 42 is located at root 82 of the protrusion 36 which is opposite to the protrusion distal end 62. The operation of the gasket inner and outer loop portions 40, 42 will be subsequently described with reference to FIGS. 8 and 9.

Turning to FIGS. 6-9, the assembly 10 is shown installed with a tubular marine handrail 12 and which allows for further description of assembly 10 in this operational/installed context.

Figure 6:
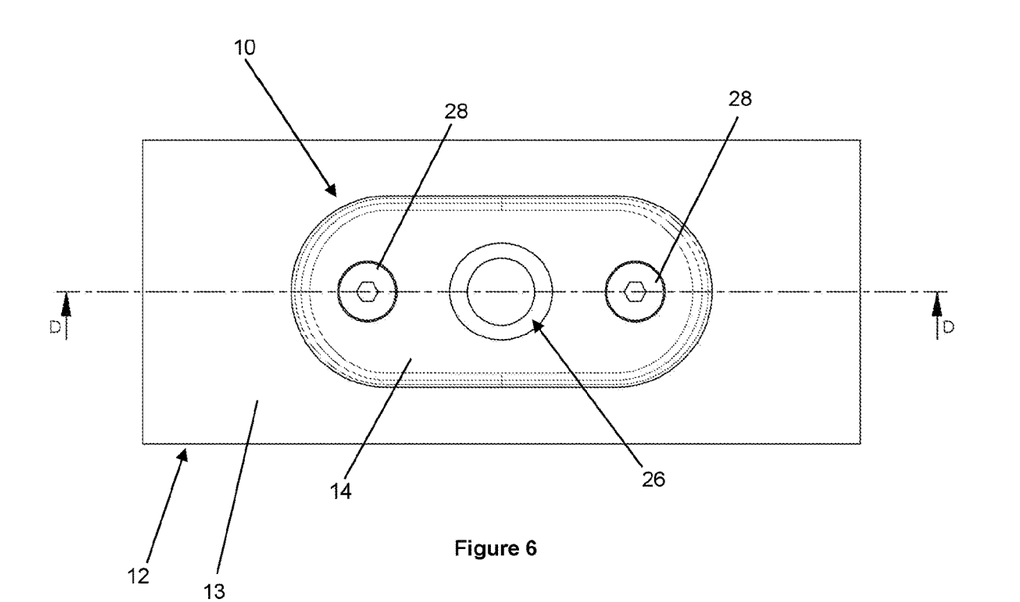
FIG. 6 is a top view of the lighting assembly of FIG. 1 installed in a handrail.
Figure 7:
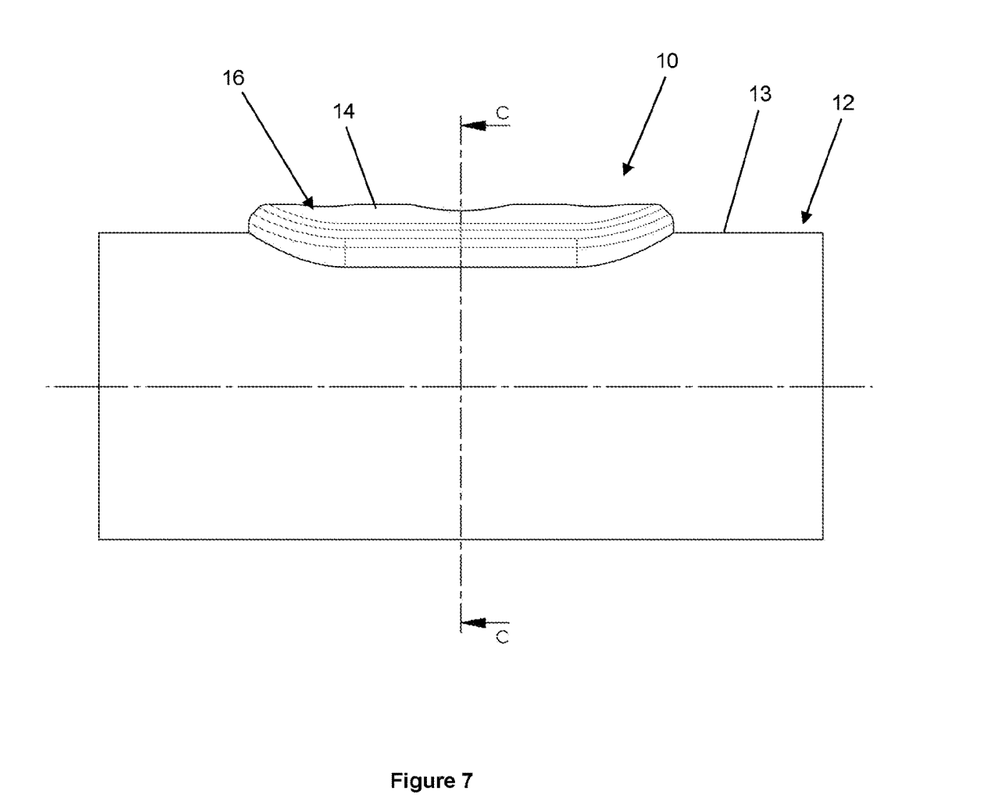
FIG. 7 is a side view of the lighting assembly installation of FIG. 6.

FIGS. 6 and 7 show exterior views (plan and side respectively) of the assembly 10 installed within the handrail 12 and in which only the mounting 14, central lighting opening 26 and bolts 28 are visible. As can be seen from FIG. 6, the mounting 14 has a width which is less than a diameter of the handrail 12. As shown in FIG. 7, the mounting 14 has a relatively small thickness so as to minimise protrusion from an external surface 13 of the handrail 12. In a particular embodiment, the outer side 16 of the mounting 14 is raised approximately 3.2 mm from the handrail surface 13.

Figure 8:
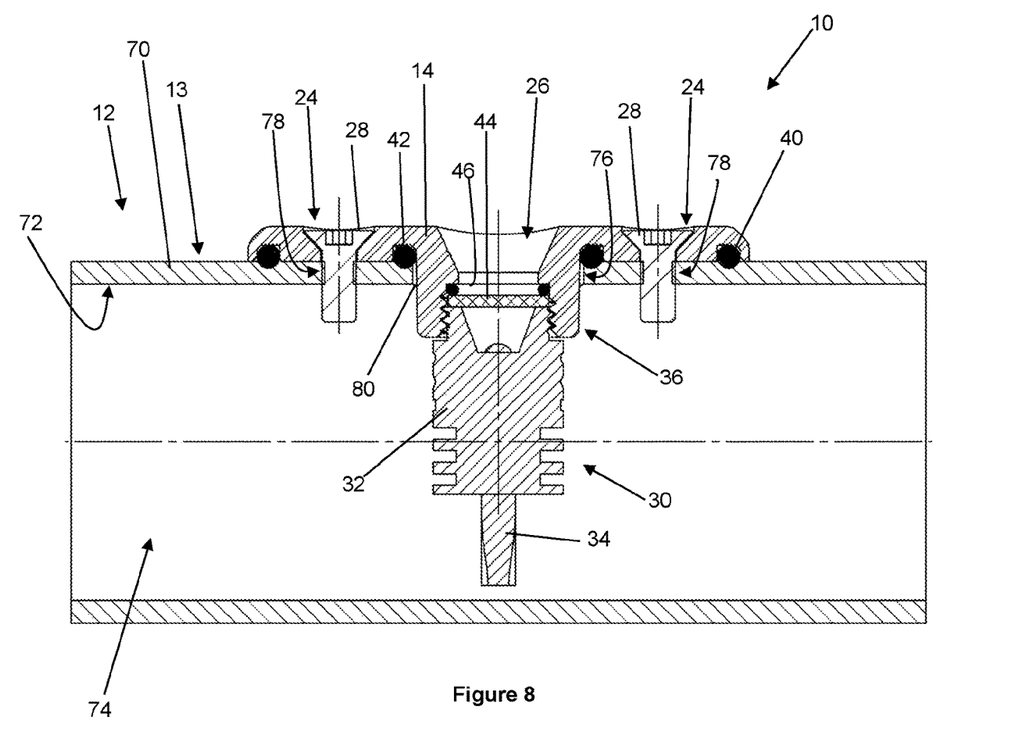
FIG. 8 is a cross-sectional view of the lighting assembly installation of FIG. 6 taken along the section labelled D-D.
Figure 9:
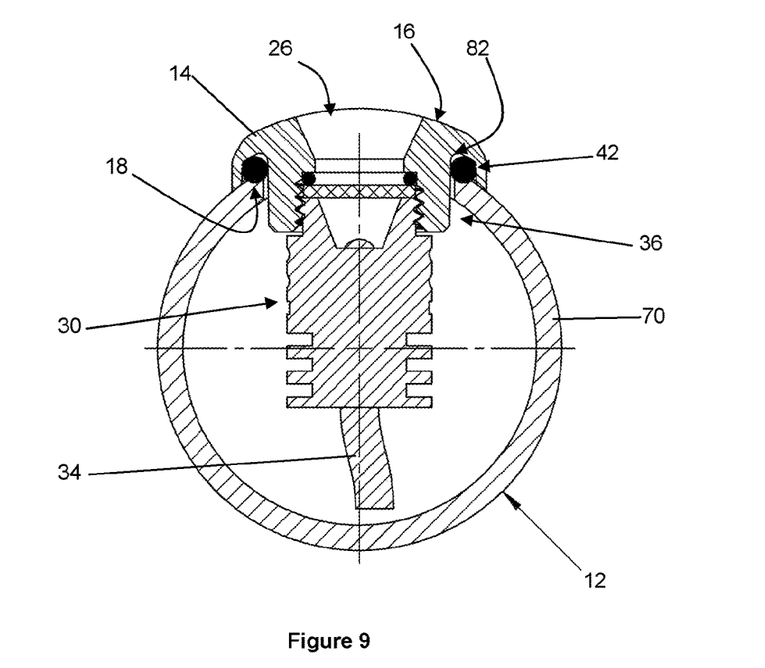
FIG. 9 is a cross-sectional view of the lighting assembly installation of FIG. 7 taken along the section labelled C-C.

FIG. 8 provides a side-sectional view taken along the section D-D in FIG. 6 and FIG. 9 provides an end-sectional view taken along the section C-C in FIG. 7.

With reference to FIGS. 8 and 9, of handrail 12 includes a tubular wall 70 which provides the external surface 13 and an interior surface 72 which surrounds the handrail interior 74. The handrail 12 includes a circular opening 76 through which the LED device 30 is inserted during installation and which is occupied by the protrusion 36 in the installed configuration shown in FIGS. 8 and 9. The handrail 12 further includes a pair of fastener holes comprising bolt holes 78 on opposite sides of the circular opening 76 and which receive the bolts 28.

The opening 76 may be formed by a rotary tool such as a holesaw or drill. As part of this procedure, a jig (not shown) may be used to achieve desired placement of the bolt holes 78 and the circular opening 76. For example, a jig may be removably secured to the handrail which includes a template corresponding to the relative positions of the bolt holes 78 and circular opening 76. The template may be used to mark the desired positions of the circular opening 76 and bolt holes 78 or, alternatively, a rotary tool may then be used to drill or cut through the template whilst the template is still attached to the handrail 12. In either case, the jig may facilitate proper positioning of the bolt holes 78 and circular opening 76 such the protrusion 36 and bolt openings 24 of the mounting will be respectively aligned with the circular handrail opening 76 and bolt holes 78 when the mounting is connected to the handrail 12.

As shown in FIGS. 8 and 9, the bolts 28 extend through the bolt openings 24 in the mounting 14 and engage with the bolt holes 78 in the handrail 12 in order to connect the mounting 14 to the handrail 12. For example, the bolts 28 may include an external thread engaged with an internal thread in the bolt holes 78. The mounting 14 overlies the bolt holes 78 and the circular opening 76 and with the protrusion 36 inserted through the circular opening 76. The protrusion 36 has a slightly smaller diameter than the circular opening 76 such that a small annular gap 80 remains between the circumferential edge of the protrusion 36 and the edge of the circular opening 76.

The gasket inner loop portion 42 is positioned at the outside of the gap 80 and forms a seal preventing water ingress through gap 80 into the handrail interior 74. The gasket outer loop portion 40 resists water and salt from entering under the mounting 14 and provides a first sealing stage against water making ingress through gap 80. In the event that water and salt did ingress beyond the outer loop portion 40, the inner loop portion provides a second sealing stage against ingress though gap 80.

This particular configuration may advantageously provide the lighting assembly 10 with an ingress protection (IP) rating of 68 according to international standard IEC 60529. It will be appreciated that IP68 denotes maximum protection against dust ingress and denotes full protection against water ingress when immersed in water.

As shown, the threaded connection between the protrusion 36 and the LED device 30 is located within the handrail interior 74. The connection (and LED device 30 more generally) is thereby protected from water and salt within the interior 74 as via the gasket 38 as well as the O-ring 46 which resists water ingress through the central lighting opening 26.

It will be appreciated that the assembly 10 is removable from the handrail 12 via the bolts 28 and furthermore that the LED device 30 is removable from the mounting 14 via the threaded connection. Removal of the assembly 10 may allow for repair or replacement of certain components. Removal of the LED device 30 from the mounting 14 may allow for the LED device 30 to be replaced or adjusted such as to replace the LED device 30 with another LED device of different light colour or different light intensity. Removal of the LED device 30 also allows access to the lens 44 which may be used to adjust the beam characteristics or colour.

Still referring to FIGS. 8 and 9, the LED device body 32 has a length sufficiently small to fit within the handrail interior 74. The power supply cable 34 is shown terminating inside the interior 74 for illustrative purposes but, in use, the power supply cable 34 extends from the LED device body 32 and may be fed along the interior 74 of the handrail 12 to additional lighting assemblies 10 installed in the same handrail 12. The A number of lighting assemblies 10 may be installed in series along the handrail 12 connected in a series to as to receive power from the same cable 34. The cable 34 may extend further to a power source located distant from at least some (and possibly all) of the lighting assemblies 10. For example, the power cable may extend through the handrail interior as close as possible to a power outlet whereupon the cable exits the handrail 12 and is electrically connected to a lighting controller connected to the power outlet and/or directly to the power outlet.

It will be appreciated, in particular from FIGS. 8 and 9, that the assembly 10 includes two lines of symmetry and, in particular, is symmetrical about its length direction and its width direction. That is, the assembly 10 is symmetrical about its length direction (i.e. the section A-A illustrated in FIG. 2) and is also symmetrical about its width direction (i.e. about the central axis C illustrated in FIG. 5).

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A marine lighting assembly configured for installation with a marine handrail which includes an opening in a curved external surface of the handrail leading to a handrail interior, the lighting assembly including:
    a mounting configured for connection to the curved external surface of the handrail in a position overlying the handrail opening, the mounting including an outer side configured to face outwardly from the handrail and an underside configured to face toward the handrail, wherein the mounting includes a protrusion extending from the underside and insertable into the handrail opening and wherein the mounting underside is curved to correspond with the curved external surface;
    at least one sealing member locatable between the mounting underside and the handrail external surface for resisting water ingress between the mounting and the handrail external surface, the sealing member located in one or more recesses provided in the mounting underside; and
    a lighting device connected with the mounting and insertable through the handrail opening, the lighting device configured for location within the handrail interior and to provide light through a lighting opening in the mounting outer side and the lighting device being removably connected to the protrusion.

2. The lighting assembly according to claim 1, the protrusion configured to extend through the handrail opening and into the handrail interior.

3. The lighting assembly according to claim 1, the lighting opening extending from the mounting outer side and centrally through the protrusion.

4. The lighting assembly according to claim 1, the lighting device being connected to the protrusion at an inside end of the lighting opening.

5. The lighting assembly according to claim 4, the protrusion and the lighting device being connected at a location within the handrail interior.

6. The lighting assembly according to claim 1, the lighting device being connected to the protrusion via a threaded engagement, the protrusion including an internal thread engaged with an external thread at an end of the lighting device.

7. The lighting assembly according to claim 1, the protrusion including a central boss extending from the mounting underside.

8. The lighting assembly according to claim 1, the mounting underside being shaped to correspond with a shape of the handrail external surface.

9. The lighting assembly according to claim 1, the sealing member including a rubber gasket or o-ring.

10. The lighting assembly according to claim 9, the sealing member comprising rubber gasket which includes an outer loop portion and an inner loop portion, the outer loop portion locatable adjacent a periphery of the mounting and the inner loop portion locatable adjacent a periphery of the handrail opening.

11. The lighting assembly according to claim 10, the inner loop portion configured for location in a recess surrounding a base of the protrusion.

12. The lighting assembly according to claim 10, wherein the outer loop portion is configured to provide a first stage of water ingress resistance and the inner loop portion is configured to provide a second stage of water ingress resistance.

13. The lighting assembly according to claim 1, the mounting including two or more fastener openings extending between the mounting outer side and mounting underside, the fastener openings configured to receive fasteners for connecting the mounting to the handrail external surface and the fastener openings including countersunk bolt openings and the assembly further including two or more bolts configured to be countersunk within the outer side of the mounting.

14. The lighting assembly according to claim 1, the lighting opening including a conical portion which narrows from the mounting outer side towards the mounting underside.

15. The lighting assembly according to claim 1, the mounting being removably connected to the handrail exterior surface to facilitate servicing and/or lighting device colour change.

16. The lighting assembly according to claim 1, further including a lens positioned at a light-emitting end of the lighting device and further including a sealing member located between the lens and an abutment portion of the mounting.

17. The lighting assembly according to claim 1, the body including heat-dissipation fins located, in use, within the handrail interior.

18. A method of installing a marine lighting assembly in a marine handrail, including the steps of:
    forming a circular opening in the marine handrail;
    forming a pair of fastener holes on opposite sides of the circular opening;
    positioning a mounting of the marine lighting assembly so as to overlie the handrail opening and whereby a lighting device is inserted into an interior of the handrail and a sealing member of the lighting assembly is located between the handrail and an underside of the mounting; and
    connecting the mounting to the handrail via fasteners engaged with the fastener holes.

19. A method according to claim 18, wherein the step of forming a circular opening in the marine handrail includes the steps of:
   attaching a jig to the handrail, the jig configured for guiding a rotary cutting or drilling tool; and
   forming the circular opening in the handrail using the rotary cutting or drilling tool guided by the jig.

20. A lighting arrangement including two or more of the lighting assembly according to claim 1, the two or more lighting assemblies being installed in a marine handrail and connected via a power cable extending through an interior of the handrail, the power cable also extending through the interior to a power source for providing electrical power to the lighting devices of the two or more lighting assemblies.

* * * * *